(12) United States Patent
Florence et al.

(10) Patent No.: US 7,835,119 B2
(45) Date of Patent: Nov. 16, 2010

(54) SHORT-CIRCUIT CONTROL IN THE INDUCTANCE OF A VOLTAGE STEP-UP CONVERTER

(75) Inventors: Arnaud Florence, Saint Antoine du Rocher (FR); Jérôme Heurtier, Tours (FR)

(73) Assignee: STMicroelectronics S.A., Montrouge (FR)

( * ) Notice: Subject to any disclaimer, the term of this patent is extended or adjusted under 35 U.S.C. 154(b) by 470 days.

(21) Appl. No.: 11/480,754

(22) Filed: Jun. 30, 2006

(65) Prior Publication Data

US 2007/0035974 A1 Feb. 15, 2007

Related U.S. Application Data

(63) Continuation-in-part of application No. PCT/FR2004/050762, filed on Dec. 30, 2004.

(30) Foreign Application Priority Data

Dec. 30, 2003 (FR) .................................. 03 51231

(51) Int. Cl.
*H02H 7/10* (2006.01)
(52) U.S. Cl. ........................................................ 361/18
(58) Field of Classification Search .................... 361/18
See application file for complete search history.

(56) References Cited

U.S. PATENT DOCUMENTS

| 4,377,151 | A | * | 3/1983 | Gerry ........................... 123/618 |
| 5,726,845 | A | | 3/1998 | Ho |
| 5,786,992 | A | * | 7/1998 | Vinciarelli et al. ............ 363/89 |
| 5,998,977 | A | | 12/1999 | Hsu et al. |
| 6,031,702 | A | * | 2/2000 | Williams ...................... 361/87 |
| 6,185,082 | B1 | | 2/2001 | Yang |
| 6,542,344 | B1 | * | 4/2003 | Mashiko ..................... 361/93.9 |

FOREIGN PATENT DOCUMENTS

JP 06351232 12/1994
JP 07194100 7/1995

OTHER PUBLICATIONS

International Search Report, PCT/FR2004/050762, Apr. 22, 2005.

* cited by examiner

*Primary Examiner*—Jared J Fureman
*Assistant Examiner*—Nicholas Ieva
(74) *Attorney, Agent, or Firm*—Lisa K. Jorgenson; Paul F. Rusyn; Graybeal Jackson LLP

(57) ABSTRACT

The protection of an inductance of a voltage step-up converter, comprising a first switch with an inverted input logic between the inductance and a terminal of connection of a load to be supplied, the control electrode of which can be connected either to the inductance supply voltage, or to a voltage smaller than the voltage of a power electrode of said first switch, on the inductance side.

27 Claims, 3 Drawing Sheets

SHORT-CIRCUIT CONTROL IN THE INDUCTANCE OF A VOLTAGE STEP-UP CONVERTER

PRIORITY CLAIM

The present application is a Continuation-in-Part of International Patent Application No. PCT/FR2004/050762, filed Dec. 30, 2004; which application claims the benefit of French Patent Application No. 03/51231, filed Dec. 30, 2003; all of the foregoing applications are incorporated herein by reference in their entireties.

TECHNICAL FIELD

Embodiments of the present invention generally relate to the field of power converters made in the form of electronic circuits from an inductive element. Embodiments of the present invention more specifically relate to the management of the starting of such converters in a voltage step-up converter arrangement.

BACKGROUND

FIG. 1 shows a first example of a conventional diagram of a voltage step-up device of the type to which embodiments of the present invention apply.

Such a converter is essentially formed of an inductance L in series with a rectifying diode D between two terminals E and S respectively defining a positive input terminal of a D.C. supply voltage Vdc and a negative output terminal of a D.C. voltage Vout of a higher level than voltage Vdc. Voltages Vdc and Vout are, in this example, referenced to a common ground M. For galvanic isolation, the input and output grounds may however be different. To perform the voltage step-up function, a switch K (generally, an N-channel MOS power transistor) connects junction point 1 of inductance L and diode D to ground M. Switch K is controlled by a pulse train provided by an electronic control circuit 2 (CTRL). During periods when switch K is on, power is built up in inductance L. During periods when switch K is off, this power is given back via diode D at the converter output. Most often, a power storage capacitor C connects terminals S and M to supply a load 3 (Q) connected between terminals S and M with a steady voltage. Capacitor C is sometimes omitted, either because a capacitor is included in load 3, or because it does not need a steady power supply.

The pulse train for controlling switch K may be a pulse train of fixed frequency and pulse-width modulated (PWM), a pulse train of fixed duty cycle but pulse-frequency modulated (PFM), or any other settable pulse train. Generally, circuit 2 receives an information REG relative to output voltage Vout to enable controlling on periods of switch K to maintain the desired voltage Vout.

A recurring problem of a step-up converter of the type shown in FIG. 1 is that in case of a short-circuit in load 3, the current stored in the inductance is no longer controllable, which results in a deterioration thereof.

A first known solution to overcome this phenomenon is shown in FIG. 1 and consists of providing a power cut-off circuit formed of a resistor in series with a switch Kd to short-circuit the starting inductance and in case of a detection of a short-circuit in the load. Such a power cut-off circuit can also directly short-circuit the series association of the diode and of the inductance.

At the converter starting or more generally when voltage Vout is smaller than voltage Vdc—which is measured by control circuit 2—switch Kd is permanently turned on and switch K remains off. This enables charging output capacitor C so that voltage Vout starts increasing. If control circuit 2 detects no increase in voltage Vout, it can then set to an alarm state after some time since this means a short-circuit on the load side.

A disadvantage of this solution is that the resistor causes a strong dissipation in the circuit and sets integration and bulk problems.

FIG. 2 shows a second conventional example of the control of a step-up converter enabling protection of the starting inductance of the circuit. In the example of FIG. 2, switch K has been shown in the form of an N-channel MOS transistor and load Q has not been shown.

According to the example, a P-channel MOS transistor 4 is interposed between the cathode of diode D and terminal S (positive electrode of capacitor C and/or of the load). The gate of transistor 4 is connected by a switch S1 either directly to source 6 of transistor 4, or to a potential smaller than this source, imposed by a Zener diode DZ. In practice, the diode anode is biased by a current source 5 connected, for example, to ground. As for switch K its gate is connected to point 1 by a Zener diode DZ2 in series with a switch S2 and to ground M by a Zener diode DZ3. The function of Zener diode DZ3 is to protect switch K by limiting its gate voltage. The function of diode DZ2 is to impose a potential difference between point 1 and the gate of transistor K when switch S2 is on. Finally, a switch S3 in series with a diode D3 is interposed between the output of circuit 2 providing the pulse train and the gate of transistor K.

In normal operation, switch S3 is on, switch S2 is off, and switch S1 is in the position where it connects the gate of transistor 4 to the potential set by diode DZ, which turns on this transistor. Switch K is thus normally controlled by means of a pulse train, which causes successive phases of charge and discharge of inductance L in capacitor C.

In the case of a short-circuit in the load (between terminals S and M), said short-circuit must be detected by annex means (for example by monitoring by means of signal REG entering control circuit 2' that voltage Vout is at approximately ground). Once the short-circuit has been detected, circuit 2' controls the turning-off of switch S3 and the turning-on of switch S2 to put into service the active clamping stage of the gate voltage of NMOS transistor K formed by diode DZ2. In practice, a resistor R3 grounding the gate of transistor K is provided to enable discharge thereof. Once the gate of transistor K has been protected, circuit 2' causes the switching of switch S1 to short-circuit its gate and source to turn it off. The turning-off of transistor 4 isolates inductance L from the rest of the circuit, and thus from the short-circuit. In the absence of diode DZ2, this turning-off would cause an overvoltage between the gate and the source of transistor K. This overvoltage is here avoided by means of diode DZ2 which clamps the voltage between the gate and the drain of transistor K.

A disadvantage of the protection circuit of FIG. 2 is that it requires a specific switch control sequence. In particular, the turning-off of transistor 4 must only occur once transistor K has been blocked by the turning-off of switch S3 and the clamping stage has been put into service by the turning-on of switch S2.

Another disadvantage of the circuit of FIG. 2 is that the amount of power stored in inductance L is not controlled.

Another disadvantage is that such a circuit is relatively bulky due to the number of annex switches that it requires.

Another disadvantage is that the restarting of the circuit generally requires a timing delay from the detection of a problem. In some cases, the diode D is replaced by a transistor controlled by the circuit 2 (FIG. 1) or 2' (FIG. 2) so as to provide a synchronous rectification and avoid a voltage drop across diode D.

SUMMARY

Embodiments of the present invention aim at avoiding all or some of the disadvantages of the convention converters. Embodiments of the present invention aim at providing a circuit for managing short-circuits in a load supplied by a step-up converter, which overcomes the disadvantages of known solutions.

Certain embodiments of the present invention especially aim at reducing the number of necessary switching elements to reduce the silicon surface in an integrated forming.

Embodiments of the present invention also aim at enabling simplification of the sequencing of the control of the protection switches used.

Embodiments of the present invention also aim at simplifying the short-circuit detection and more specifically at providing a protection element that can be independent from the control circuit of the main converter switch.

Embodiments of the present invention also aim at automatically managing the power stored in the inductive element as well as the precharge phase, thus limiting current peaks.

Embodiments of the present invention also aim at automatically controlling the restarting after a problem.

An embodiment of the present invention provides a circuit for protecting a voltage step-up converter, comprising a first switch with an inverted input logic between a rectifying element in series with an inductance and an output terminal of the converter, comprising means for connecting a control electrode of said first switch to a first voltage related to the inductance supply voltage as long as the output voltage is lower than a threshold.

According to an embodiment of the present invention, said means connect said control electrode with a potential lower than the switch potential, on the inductance side, as soon as said threshold is reached.

According to an embodiment of the present invention, the circuit comprises a selection circuit for selecting the highest potential among the supply voltage of the inductance and the voltage of the first switch on the inductance side.

According to an embodiment of the present invention, the first switch is a P-channel MOS transistor or a PNP-type bipolar transistor.

According to an embodiment of the present invention, the control electrode of the first switch is connected to its power electrode on the side of the inductance by a voltage source through a second switch.

According to an embodiment of the present invention, the control electrode of the first switch is connected to ground via a second switch.

According to an embodiment of the present invention, the rectifying element is a synchronous rectifying switch.

According to another embodiment of the present invention, a method for protecting a voltage step-up converter comprising a first switch with an inverted input logic between a rectifying element in series with an inductance and an output terminal of the converter, includes biasing the control electrode of the first switch by means of a fixed voltage linked to the inductance supply voltage as long as the output voltage is smaller than a threshold.

According to an embodiment of the present invention, the control electrode of the first switch receives a voltage, smaller than the voltage of its power electrode on the side of the inductance, as soon as said threshold has been reached.

According to an embodiment of the present invention, the threshold corresponds to the supply voltage of the inductance.

Embodiments of the present invention also provide a voltage step-up converter with a protection circuit.

BRIEF DESCRIPTION OF THE DRAWINGS

The foregoing features of the various embodiments of the present invention will be discussed in detail in the following non-limiting description of specific embodiments in connection with the accompanying drawings.

DETAILED DESCRIPTION

Figure 1:
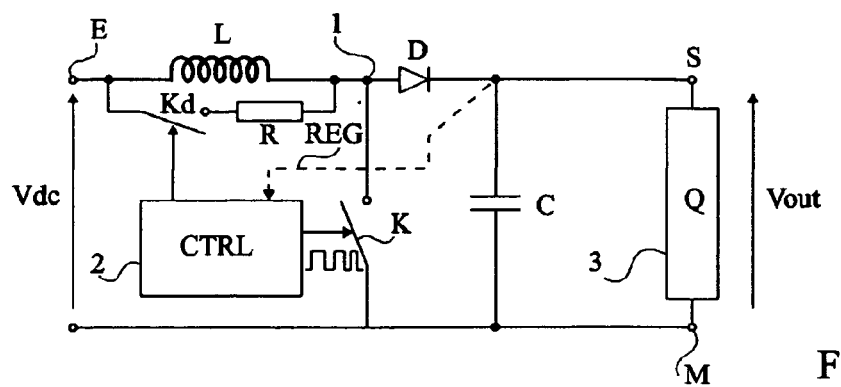
FIGS. 1 and 2, previously described, are intended to show the state of the art and the problem to solve.

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

The same elements have been designated with same reference numerals in the different drawings. For clarity, only those elements which are necessary to the understanding of embodiments of the present invention have been shown in the drawings and will be described hereafter. In particular, the details constitutive of the control circuit generating the pulse train intended for a main switch of the step-up converter as well as the control of this control signal have not been detailed, with embodiments of the present invention being compatible with any conventional pulse train control circuit.

A feature of embodiments of the present invention is to create an overvoltage on the output switch of the converter which automatically nulls out. More specifically, a switch includes an inverted input logic (PNP transistor or PMOS transistor) at the converter output and is controlled independently from the main switch of the step-up converter.

Figure 3:
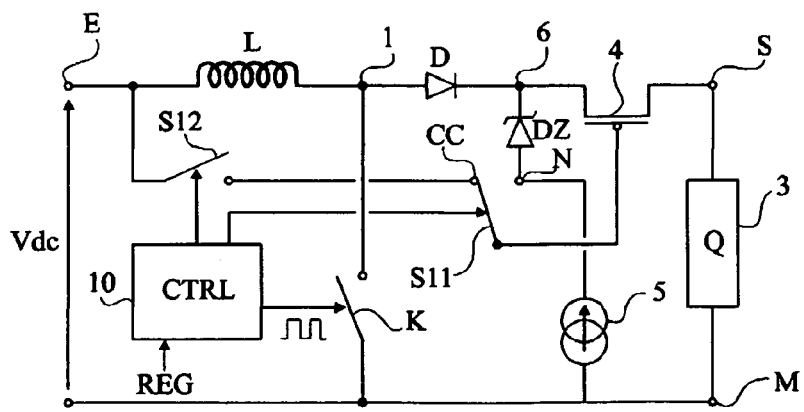
FIG. 3 schematically shows a circuit of control and protection of a step-up converter according to a first embodiment of the present invention.

FIG. 3 shows a first embodiment of a step-up converter according to one embodiment of the present invention.

As previously discussed, this converter comprises an inductance L in series with a diode D and a protection switch 4 between an input terminal E of application of a D.C. voltage Vdc and an output terminal S for providing a higher output voltage Vout. A load 3 (Q) is connected, possibly in parallel with a capacitor C (not shown), between terminal S and a ground terminal M, common or not with the input voltage ground. A circuit 10 (CTRL) controls by pulse trains a cut-off switch K connecting anode 1 of diode D to ground M.

According to an embodiment of the present invention, transistor 4 (here, a P-channel MOS transistor) is connectable, via a switch S11, either to a voltage smaller than its source 6, or to a voltage corresponding to input supply voltage Vdc. In the example shown in FIG. 3, switch S11 connects source 6 of transistor 4 via a Zener diode DZ setting a voltage threshold between the gate and the source of transistor 4 when switch S11 is connected thereto (terminal N). In practice, the anode of diode DZ (terminal N) is biased, for example, by a current source 5. Any other voltage source imposing, between the gate and the source of transistor 4, a voltage smaller than its threshold voltage to turn it on is appropriate.

As an alternative, terminal N of switch S11 may correspond to ground M rather than be connected to source 6 of transistor 4 by a diode DZ, if transistor 4 holds a voltage Vgs close to voltage Vout.

The other terminal CC of switch S11, intended to connect the gate to the positive potential of voltage Vdc, is connected, for example, to terminal E via a switch S12. The function of switch S12 is to force the blocking of transistor 4 when the circuit must be turned off.

According to an embodiment of the present invention, the bias point of the gate of transistor 4 is always smaller than the output voltage in normal operation, but becomes greater than this output voltage at least in case of a short-circuit.

At the circuit starting, that is, when voltage Vout is zero, switch S12 is on and switch S11 is on position CC. Transistor 4 is then on and circuit 10 conventionally controls switch K.

As soon as voltage Vout (in this example, detected via signal REG) becomes greater than a predetermined threshold (for example, greater than voltage Vdc), circuit 10 switches switch S11 to terminal N. This results in maintaining transistor 4 in the on state but while being now biased by the voltage difference between its gate and its source, set by Zener diode DZ. Switch S12 is indifferently left on or off.

In case of a short-circuit in load Q or more generally as soon as voltage Vout becomes smaller than the threshold set in circuit 10, the latter controls the switching of switch S11 to terminal CC (and the turning-on of switch S12 if it had been previously turned off). MOS transistor 4 thus remains on and enables transfer of the power stored in inductance L before the short-circuit through the load. Indeed, the overvoltage across inductance L imposes a greater voltage on source 6 of MOS transistor 4 with respect to input voltage E, which ensures its turning-on for the time necessary to carry off or remove the inductance power.

Figure 2:
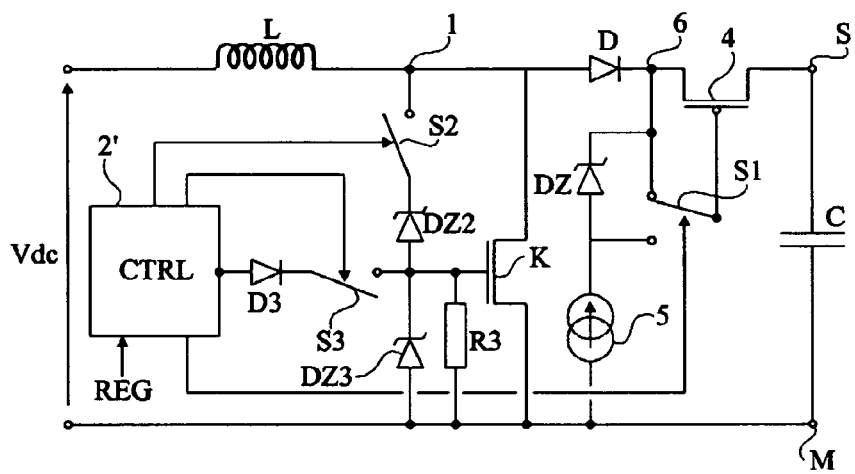

From the foregoing, the state of switch K at the time when switch S11 switches is of no importance. Thus, the sequencing is simpler than in an active clamping circuit such as described hereabove in relation with FIG. 2.

Another advantage of this embodiment of the present invention is that it avoids a Zener diode device for the active clamping.

Another advantage of this embodiment of the present invention is that it eases the converter starting by introducing an automatic protection due to the connection to the input voltage (for example, the voltage of a battery). The fact for transistor 4 to result in the starting avoids differentiating the starting phase from a short-circuit. This advantage is significant since, as long as voltage Vout has not started increasing, a conventional control circuit must make out this starting from a short-circuit. In particular, the use of a counter, as would be the case in a conventional device (FIG. 2), is avoided.

Another advantage of this embodiment of the present invention is that, more generally than a simple protection against short-circuits, it enables automatic management of the power discharge of the inductance, switch S11 being switched to point N as soon as voltage Vout has reached a sufficient level.

Figure 4:
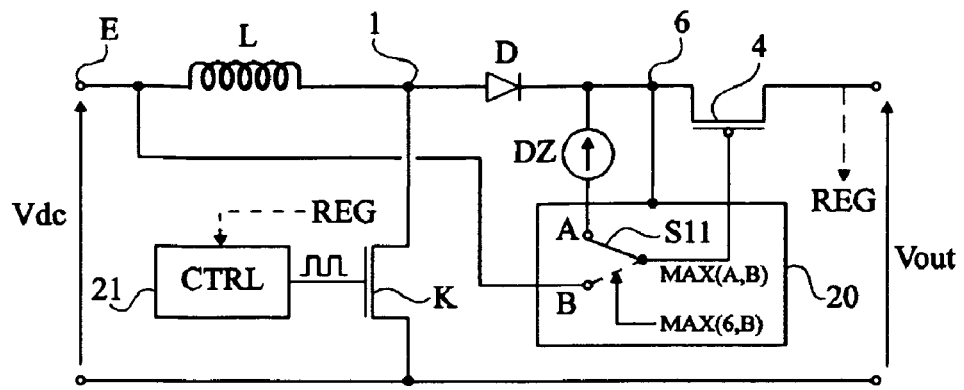
FIG. 4 shows a second embodiment of the present invention applied to an autonomous protection circuit.

FIG. 4 shows a converter according to a second embodiment of the present invention.

As compared to the converter of FIG. 3, the detection of a short-circuit (or of an insufficient voltage Vout A is performed by an autonomous circuit 20 with respect to control circuit 21 providing the pulse train to the gate of switch K. Circuit 20 comprises two inputs A and B respectively receiving source voltage 6 of transistor 4 decreased by a voltage DZ and supply voltage Vdc sampled at point E of the assembly. An output MAX(A, B) of circuit 20 is connected to the gate of transistor 4. The function of circuit 20 is to provide the highest voltage from among those present on its inputs A and B. In practice, circuit 20 measures the voltage of source 6 of transistor 4 and provides the voltage present on its input A as soon as the voltage of source 6 becomes greater than voltage Vdc.

An advantage of this embodiment is that it enables automatic short-circuit detection by circuit 20.

Control circuit 21 then is a conventional circuit contenting itself with the pulse train control and with the control of this pulse train with respect to the output voltage measurement (for example, a circuit such as circuit 2 of FIG. 1, without the control of switch Kd).

Figure 5:
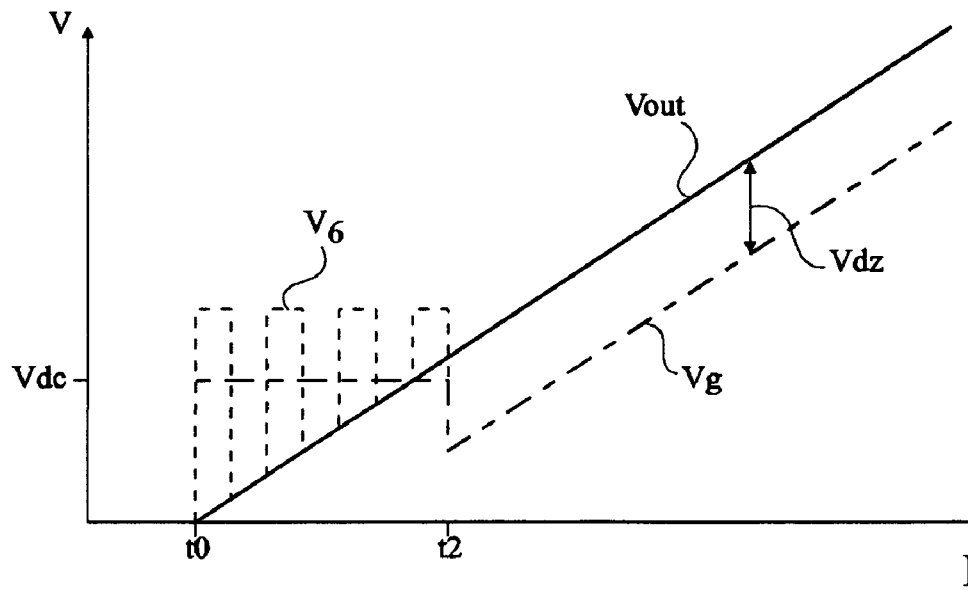
FIG. 5 illustrates the operation of the protection circuit of FIG. 4.

FIG. 5 illustrates the operation of circuit 20 of FIG. 4. It should however be noted that the same function may be performed by circuit 10 of FIG. 3 by exploiting a measurement of the output voltage on terminal REG.

FIG. 5 shows an example of the shape of several characteristic voltages of circuit 20 along time upon starting of the circuit. Voltage Vout is shown in a full line. Voltage V6 of source 6 of transistor 4 is shown in dotted lines. Gate control voltage Vg of transistor 4 is shown in stripe-dot lines.

For simplification, the possible voltage drops in switches S11 and S12 when on have been neglected.

Initially, the circuit is off, and no voltage is applied on terminal E.

At a time t0, the converter is powered on. The gate voltage of transistor 4 is then brought to the voltage of terminal E (Vdc). Voltage V6 of its source corresponds to voltage Vdc (applied on the transistor gate) increased by a periodic overvoltage linked to the switching in the inductance. Transistor 4 is then on and the power transfer is performed towards voltage Vout when switch K is off at the rate of the control pulse train.

At a time t2 when voltage V6 reaches level Vdc, circuit 20 switches its output and now applies, on the gate of transistor 4, voltage V6 decreased by value Vdz of the Zener diode, and the overvoltage disappears. Voltage Vout keeps on increasing until the level desired by circuit 21 is reached (not shown in FIG. 5).

The same operation occurs in case of a decrease in voltage Vout. As soon as voltage V6 becomes smaller than voltage Vdc, transistor 4 becomes controlled by this voltage Vdc.

Figure 6:
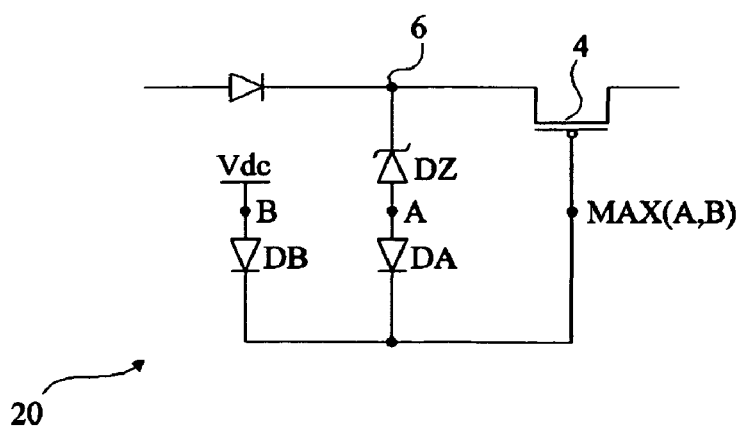
FIG. 6 shows an example of a practical forming of the protection circuit of FIG. 4.

FIG. 6 shows an example of the practical forming of circuit 20 of FIG. 4. Terminals A and B are respectively connected to output terminal MAX(A, B) by two diodes DB and DA by their respective cathodes.

An advantage of this embodiment of the present invention is that it manages all current overloads (Vout smaller than Vdc) whatever their origin, be it an overload, a short-circuit, or inrushes.

Figure 7:
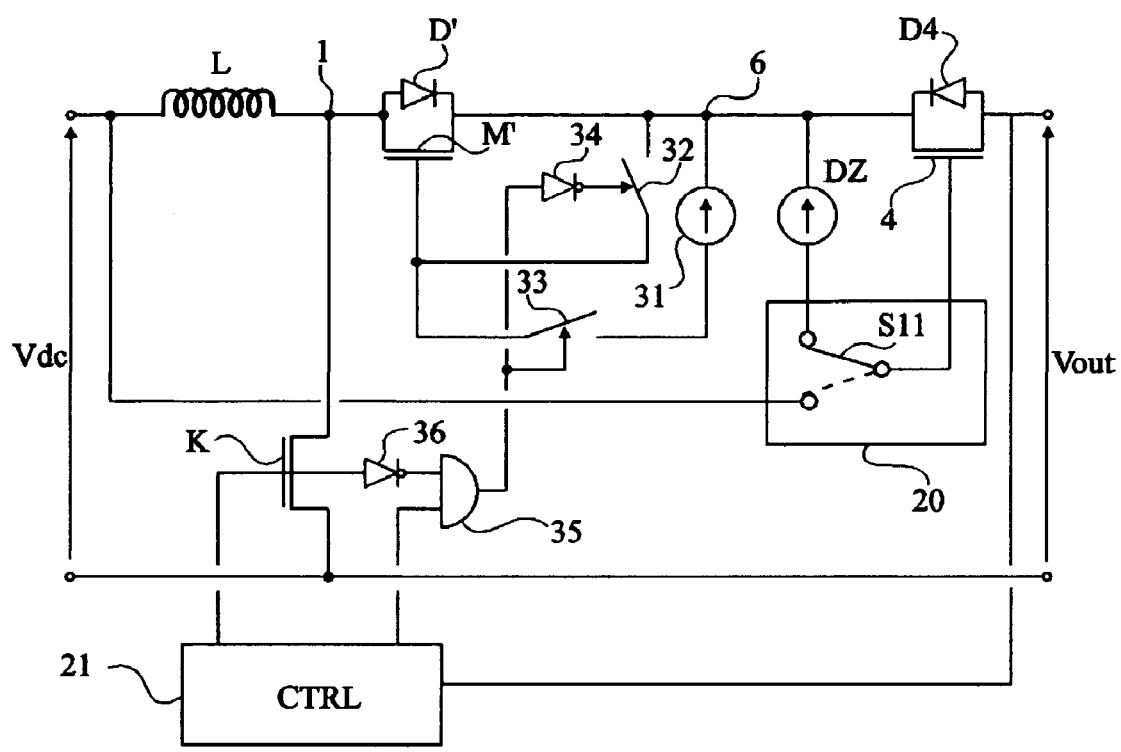
FIG. 7 schematically shows a third embodiment of a circuit of control and protection of a synchronous step-up converter according to the present invention.

FIG. 7 illustrates a third embodiment of a control and protection circuit for a step-up voltage converter applied to a synchronous rectification.

With respect to the embodiment shown in FIG. 4, diode D is replaced by a transistor M controlled by a circuit 21' (CTRL) in order to provide a synchronous rectification and therefore minimizing the voltage drop between terminals 1 and 6. In FIG. 7, the parasitic diodes D' and D4 of transistors M' and 4 have been shown, the transistors M' and 4 being connected so that their respective parasitic diodes are in ant-series.

The gate of transistor M' can be connected to terminal 6 either directly either through a voltage source 31. The connections are obtained by means of two switches 32 and 33 respectively connecting the gate of transistor M' to terminal 6 and this gate to a first terminal of voltage source 31, the other terminal of which is connected to terminal 6. The switches 32 and 33 are connected in an inverted way, an inverter 34 of a control signal provided, for example, by an AND gate 35 being inserted between the control terminal of switch 33 and the control terminal of switch 32. The AND gate 35 combines the inverse (inverter 36) of the control signal of the switching transistor K with a signal, provided by circuit 21, indicating that the output voltage Vout is greater than a threshold.

The circuit of FIG. 7 operates as follows. The transistor M' is turned on when the switch K is off (i.e. the inductive element L discharges towards the output 6 and the corresponding current is higher than the threshold TH). The transistor M' is off when the switch K is on or when the current (circulating in the supplied load) is smaller than the threshold TH. The threshold TH is selected at a low value (ideally 0) so as to turn off the switch M' when the inductance has no more current to discharge in the load. To turn off the transistor M', the switch 32 is turned on and the switch 33 is turned off. Inversely, for turning on transistor M', the switch 33 is turned on and the switch 34 is turned off so as to obtain a sufficient gate/source voltage from the voltage source 31 (for example a Zener diode of some volts).

The above operation is equivalent to the fact that, when the output voltage Vout is lower than a threshold, the transistor M' operates as a diode. When the voltage Vout is higher than this threshold and when the circuit is in a normal operation mode (not in the turn on period or during a protection period by the circuit 20), the transistor M' is turned on.

Of course, embodiments of the present invention are likely to have various, alterations, improvements, and modifications which will readily occur to those skilled in the art. In particular, the sizing of Zener diode DZ which depends on the used MOS transistor 4 will be adapted to the breakdown gate-source voltage of MOS transistor 4.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

Embodiments of the present invention may be applied to a variety of different types of electronic circuits, such as power converters. These electronic circuits may, in turn, be included in a variety of different types of electronic devices and systems, such as mobile or cellular phones, computer systems and so on.

Additionally, the implementation of control circuit adapted to carry out the invention can be easily made by those skilled in the art from the above functional explanations.

What is claimed is:

1. A circuit for protecting a voltage step-up converter, comprising a first switch with an inverted input logic, a rectifying element, and an inductance connected in series between an input terminal and an output terminal, the first switch being coupled between the rectifying element and the output terminal of the converter and the interconnection of the rectifying element and the first switch being designated a power electrode, wherein the circuit comprises control circuitry operable to connect a control electrode of said first switch to an inductance supply voltage applied to the input terminal as long as the output voltage is lower than a threshold, and the control circuitry further operable to connect the control electrode of said first switch to a voltage that is less than a voltage on the power electrode when the output voltage reaches the threshold.

2. The circuit of claim 1, further comprising a Zener diode having its cathode connected to the power electrode and operable to provide on its anode the voltage that is less than the voltage on the power electrode.

3. A circuit for protecting a voltage step-up converter, comprising a first switch with an inverted input logic, a rectifying element, and an inductance connected in series between an input terminal and an output terminal, the first switch being coupled between the rectifying element and the output terminal of the converter and the interconnection of the rectifying element and the first switch being designated a power electrode, wherein the circuit comprises control circuitry operable to connect a control electrode of said first switch to an inductance supply voltage applied to the input terminal as long as the output voltage is lower than a threshold, and the control circuitry further operable to connect the control electrode of said first switch to a voltage that is less than a voltage on the power electrode when the output voltage reaches the threshold, further comprising a selection circuit for selecting the highest potential among the inductance supply voltage and the voltage on the power electrode.

4. The circuit of claim 1, wherein the first switch comprises a P-channel MOS transistor or a PNP bipolar transistor.

5. The circuit of claim 2, wherein the control electrode of the first switch is connected to the anode of the Zener diode through a second switch.

6. The circuit of claim 1, wherein the control circuitry is operable to connect the control electrode of the first switch to ground to thereby connect the control electrode of the first switch to a voltage that is less than the voltage on the power electrode when the output voltage reaches the threshold.

7. The circuit of claim 1, wherein the rectifying element comprises a synchronous rectifying switch.

8. A method for protecting a voltage step-up converter having a first switch with a control electrode, a rectifying element, and an inductance connected in series between an input terminal and an output terminal of the converter, the first switch being coupled between the rectifying element and the output terminal, and the method comprising biasing the control electrode of the first switch by means of an inductance supply voltage applied to the input terminal as long as the output voltage is smaller than a threshold.

9. The method of claim 8, wherein a power node is defined at the interconnection of the rectifying element and the first switch, and wherein the control electrode of the first switch receives a voltage smaller than the voltage on the power node, as soon as said threshold has been reached.

10. A protection circuit including a power node adapted to be coupled to a series-connected rectifying element and inductive element, and including an output node and a control node, the protection circuit operable to either couple the power node to the output node or to isolate the power node from the output node responsive to a voltage on the control node, and the protection circuit being further operable in a protection mode to apply to the control node an input voltage applied to the inductive element to thereby cause the protection circuit to isolate the power node from the output node except when the voltage on the power node is greater than the input voltage, with the protection circuit coupling the power node to the output node to remove power from the inductive element when the voltage on the power node is greater than the input voltage, and the protection circuit being further operable in a normal mode to apply a second voltage to the control node, the second voltage being less than a voltage on the power node to cause the protection circuit to couple the power node to the output node.

11. The protection circuit of claim 10, wherein the protection circuit comprises a PMOS transistor.

12. The protection circuit of claim 10, wherein the protection circuit operates in the protection mode in response to a voltage on the output node being less than a predetermined threshold value.

13. The protection circuit of claim 10, wherein the protection circuit operates in the protection mode in response to a voltage on the power node being less than the input voltage applied to the inductive element.

14. A protection circuit including a power node adapted to be coupled to a series-connected rectifying element and inductive element, and including an output node and a control node, the protection circuit operable to either couple the power node to the output node or to isolate the power node from the output node responsive to a voltage on the control node, and the protection circuit being further operable in a protection mode to apply to the control node an input voltage applied to the inductive element to thereby cause the protection circuit to isolate the power node from the output node except when the voltage on the power node is greater than the input voltage, with the protection circuit coupling the power node to the output node to remove power from the inductive element when the voltage on the power node is greater than the input voltage, and the protection circuit being further operable in a normal mode to apply a second voltage to the control node, the second voltage being less than a voltage on the power node to cause the protection circuit to couple the power node to the output node, and a voltage generation circuit coupled between the power and control nodes, the voltage generation circuit operable to generate the second voltage responsive to a voltage on the power node.

15. The protection circuit of claim 14, wherein the voltage generation circuit comprises a Zener diode.

16. The protection circuit of claim 10, further comprising a capacitance coupled between the output node and a reference node.

17. The protection circuit of claim 10,
wherein the protection circuit comprises a PMOS transistor having a source node coupled to the power node and a drain node coupled to the output node, and a control input coupled to the control node; and
wherein the protection circuit further comprises,
a first diode having an anode adapted to receive the input voltage and a cathode coupled to the control input of the PMOS transistor; and
a Zener diode and a second diode coupled in series between the source node and the control input, with an anode of the Zener diode being coupled to an anode of the second diode.

18. A method for protecting a voltage step-up converter including a first switch coupled in series with an inductance and a rectifying element, the first switch including a control node, a first node coupled to the rectifying element, and an output node and the inductance adapted to receive an input voltage, the method comprising:
biasing the control node of the first switch with the input voltage in response to either a voltage on the output node being less than a threshold value or in response to a voltage on the first node being less than the input voltage; and
biasing the control node with a second voltage that is less than the voltage on the first node.

19. The method of claim 18, wherein the first voltage corresponds to the input voltage.

20. The method of claim 18, wherein the rectifying element comprises a transistor.

21. The method of claim 18, wherein the threshold value equals a value of the input voltage.

22. An electronic device, comprising:
an electronic circuit including,
a protection circuit including a power node adapted to be coupled to a series-connected rectifying element and inductive element, and including an output node and a control node, the protection circuit operable to either couple the power node to the output node or to isolate the power node from the output node responsive to a voltage on the control node, and the protection circuit being further operable in a protection mode to apply to the control node an input voltage applied to the inductive element to thereby cause the protection circuit to isolate the power node from the output node except when the voltage on the power node is greater than the input voltage, with the protection circuit coupling the power node to the output node to remove power from the inductive element when the voltage on the power node is greater than the input voltage, and the protection circuit being further operable in a normal mode to apply a second voltage to the control node, the second voltage being less than a voltage on the power node to couple the power node to the output node.

23. The device of claim 22, further comprising a control circuit including a switching circuit coupled through a rectifying element to the power node of the protection circuit, and the control circuit being coupled to the output node of the protection circuit, the control circuit operable to apply a signal to the switching circuit to turn the switching circuit on and off as a function of a voltage on the output node.

24. The electronic device of claim 22, wherein the electronic circuit comprises a power converter.

25. The electronic device of claim 24, wherein the electronic circuit comprises mobile or cellular telephone circuitry.

26. The method of claim 8, wherein said threshold corresponds to the inductance supply voltage.

27. A voltage step-up converter comprising the protection circuit of claim 1.

* * * * *